Sept. 20, 1927.

M. I. BYRNES 1,642,804

PACKAGED UNBAKED DOUGH LAYER

Filed Aug. 12, 1925

Inventor

M. I. Byrnes

By Lacy & Lacy, Attorneys

Patented Sept. 20, 1927.

1,642,804

UNITED STATES PATENT OFFICE.

MARY IRENE BYRNES, OF DES MOINES, IOWA.

PACKAGED UNBAKED-DOUGH LAYER.

Application filed August 12, 1925. Serial No. 49,796.

This invention relates to means whereby raw pie dough may be furnished to a housewife in the form of a thin layer ready to be placed in a pie pan and a filler of fruit or other food stuff introduced into the pan, thus saving the housewife the time and trouble incident to the making of a batch of dough and rolling the same into a thin layer.

An object of the invention is to provide a novel means for packing the unbaked dough layer so that it will be effectually protected from contact with the atmosphere and maintained in its proper plastic condition in the relatively brief time between its manufacture and sale.

Figure 1:
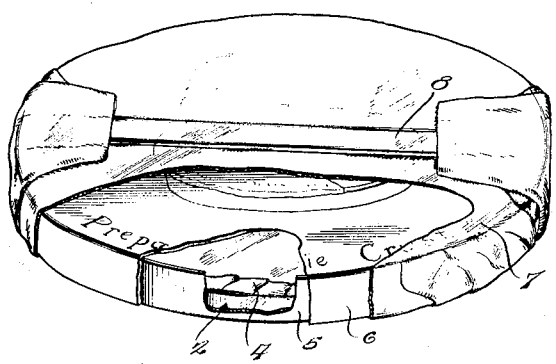
Figure 1 is a perspective view of the unbaked packaged dough layer embodying the invention, parts being broken away to better illustrate the manner in which the layer is packaged.
Figure 2:
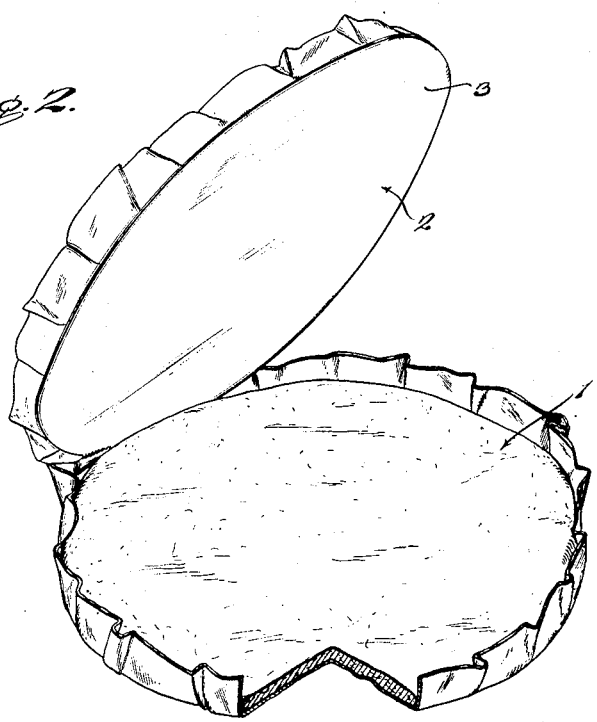
Figure 2 is a perspective view illustrating the manner in which the layer is directly enveloped or wrapped, before being placed in the container in which it is to be dispensed.

The invention contemplates, as previously stated, the provision of a packaged unbaked pie crust, and in the drawings, the numeral 1 indicates a layer of unbaked dough which preferably comprises one and one-quarter cups of flour, five tablespoons of lard, one-quarter teaspoon of salt, and one-quarter cup of cold water, which ingredients are mixed together in the usual manner and the dough thus produced rolled to flat circular form so that a layer of unbaked dough, suitably shortened, by reason of the quantity of lard employed, is produced. This layer 1 is of a diameter to properly fit within the ordinary pie pan and is of the same thickness as the crust layers of dough usually made by the housewife in making pies.

After the dough layer 1 has been prepared, the same is laid upon a sheet of oiled paper, indicated in the drawings by the numeral 2 and which sheet comprises two approximately circular portions 3, which are joined midway between the ends of the sheet. The layer is laid upon one of the said portions 3 and the other portion is folded over to overlie the layer, and the marginal portions of the two portions 3 of the sheet are then crimped or folded over, as indicated by the numeral 4 and as best shown in Figure 1 of the drawings, so as to completely enclose the layer 1. The wrapped layer is then placed in a flat circular carton or container which may be of strawboard or the like, and comprises the usual body 5 and the cover section 6 which is removably fitted thereto. The carton is then wrapped in moisture-proof paper indicated by the numeral 7, and the wrapping is folded and suitably sealed as indicated by the numeral 8.

The packaged unbaked dough layer is kept at a low temperature until it is sold, and in preparing a pie, the person has only to unwrap the package and deposit the layer in the ordinary pie pan, introduce the fruit or other filler, and bake the pie in the usual manner. It has been found that where a shortened dough is prepared as stated above, and is kept for a reasonable period of time, as for example twelve hours or more, it will, when baked, produce a flaky and tender crust, and will not be soggy as is sometimes the case where freshly made dough is employed.

It will be understood, of course, that the wrapping 2, being of oiled paper, will effectually prevent evaporation of the moisture content of the layer 1 and exclude air from the said layer. Likewise, the container or carton comprising the body section 5 and lid section 6, is sufficiently rigid to insure against the layer being deformed through handling at the time of its packing and sale.

Having thus described the invention, what I claim is:

A wrapper for a pie crust dough layer comprising a paper blank consisting of two counterpart substantially circular body portions integrally joined at one side for a short portion of their margins and of a diameter somewhat greater than that of the layer to be wrapped, whereby the said portions may overlie and completely cover the opposite sides of the said layer and their projecting marginal portions may be crimped together about the layer and be folded flat inwardly over one of the said portions.

In testimony whereof I affix my signature.

MARY IRENE BYRNES. [L. S.]